United States Patent
Matsunaga et al.

(10) Patent No.: US 10,184,515 B2
(45) Date of Patent: Jan. 22, 2019

(54) ANTI-FRICTION BEARING

(71) Applicant: NSK LTD., Tokyo (JP)

(72) Inventors: Kyohei Matsunaga, Fujisawa (JP); Yoshiaki Katsuno, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/548,552

(22) PCT Filed: Jan. 14, 2016

(86) PCT No.: PCT/JP2016/051023
§ 371 (c)(1),
(2) Date: Aug. 3, 2017

(87) PCT Pub. No.: WO2016/125555
PCT Pub. Date: Aug. 11, 2016

(65) Prior Publication Data
US 2018/0023621 A1   Jan. 25, 2018

(30) Foreign Application Priority Data

Feb. 4, 2015   (JP) ................................ 2015-020738

(51) Int. Cl.
*F16C 33/66* (2006.01)
*F16C 19/16* (2006.01)
(Continued)

(52) U.S. Cl.
CPC ............ *F16C 19/163* (2013.01); *F16C 19/16* (2013.01); *F16C 19/26* (2013.01); *F16C 19/548* (2013.01);
(Continued)

(58) Field of Classification Search
CPC ................ F16C 19/163; F16C 33/6662; F16C 2322/39; F16N 7/32
See application file for complete search history.

(56) References Cited

U.S. PATENT DOCUMENTS 3,195,965 A * 7/1965 Van Dorn ........... F16C 33/6662
384/475
6,176,349 B1 * 1/2001 Kishi .................... F16C 19/163
184/55.1
(Continued)

FOREIGN PATENT DOCUMENTS

CN    1400406 A     3/2003
CN    103635708 A   3/2014
(Continued)

OTHER PUBLICATIONS

International Search Report dated Mar. 22, 2016, issued by the International Searching Authority in counterpart International Application No. PCT/JP2016/051023 (PCT/ISA/210).
(Continued)

*Primary Examiner* — Phillip A Johnson
(74) *Attorney, Agent, or Firm* — Sughrue Mion, PLLC

(57) ABSTRACT

In an angular ball bearing, an outer ring is provided with a plurality of oil holes. The circumferential phases of the plurality of oil holes are θ≥45°, when the angular rolling bearing is viewed in the axial direction during rotation of the bearing, when the center of a ball passes through the center line of one oil hole, the ball closest to the remaining oil hole is located at a position which intersects with the center line of the other oil hole, and when an angle formed by a straight line passing through the center of the ball closest to the oil hole and perpendicular to the radial direction of the angular ball bearing, and a tangent at a contact point between the center line of the oil hole and the ball is set as (θ) when the angular rolling bearing is viewed from the axial direction.

12 Claims, 8 Drawing Sheets

(51) Int. Cl.
  *F16N 7/32* (2006.01)
  *F16C 33/64* (2006.01)
  *F16C 19/26* (2006.01)
  *F16C 19/54* (2006.01)
  *F16C 33/58* (2006.01)
  *F16C 33/76* (2006.01)

(52) U.S. Cl.
  CPC .......... *F16C 33/583* (2013.01); *F16C 33/585* (2013.01); *F16C 33/586* (2013.01); *F16C 33/64* (2013.01); *F16C 33/66* (2013.01); *F16C 33/6662* (2013.01); *F16N 7/32* (2013.01); *F16C 19/546* (2013.01); *F16C 33/768* (2013.01); *F16C 2322/39* (2013.01)

(56) References Cited

U.S. PATENT DOCUMENTS

| | | | |
|---|---|---|---|
| 8,646,983 B2 * | 2/2014 | Hayashi | ........ F16C 33/46 384/470 |
| 2003/0113048 A1 | 6/2003 | Azumi et al. | |
| 2005/0129342 A1 | 6/2005 | Azumi et al. | |
| 2007/0266821 A1 | 11/2007 | Azumi et al. | |
| 2008/0080801 A1 | 4/2008 | Suzuki et al. | |
| 2008/0121465 A1 | 5/2008 | Suzuki et al. | |
| 2013/0202237 A1 | 8/2013 | Kosugi | |

FOREIGN PATENT DOCUMENTS

| | | | | |
|---|---|---|---|---|
| CN | 204003951 U | | 12/2014 | |
| DE | 19530903 A1 | * | 3/1996 | ........... F16C 19/163 |
| DE | 102005052677 A1 | | 5/2007 | |
| JP | 11-62991 A | | 3/1999 | |
| JP | 2006200740 A | | 8/2006 | |
| JP | 2009-41676 A | | 2/2009 | |
| JP | 2010-1921 A | | 1/2010 | |
| JP | 2010090915 A | * | 4/2010 | ........... F16C 33/4605 |
| JP | 201315152 A | | 1/2013 | |
| JP | 201379711 A | | 5/2013 | |
| JP | 5286962 B2 | | 9/2013 | |

OTHER PUBLICATIONS

Written Opinion dated Mar. 22, 2016, issued by the International Searching Authority in counterpart International Application No. PCT/JP2016/051023 (PCT/ISA/237).

Communication dated Oct. 4, 2017, issued by the European Patent Office in counterpart European Patent Application No. 16746386.8.

Communication dated Jul. 24, 2018, issued by the State Intellectual Property Office of the People's Republic of China in counterpart Chinese Application No. 201680008960.X.

* cited by examiner

ANTI-FRICTION BEARING

TECHNICAL FIELD

The present invention relates to a rolling bearing, and more particularly, to an outer ring lubricating type rolling bearing.

BACKGROUND ART

In recent years, the demand for high-speed operation has increased for the spindle for machine tools with the aim of improving the cutting efficiency. In addition, in recent years, in order to improve the efficiency of production, corresponding needs to 5-axis working machine capable of machining a complex shaped workpiece without a changeover, without using a plurality of machine tools have emerged. In the 5-axis working machine, because the spindle and the table turn, from the demands for the space saving due to shortening of the turning radius, or power saving due to the reduction in inertia at the time of turning, the reduction in weight and the like, reduction in the axial length of the spindle is required.

Grease lubrication, oil-air lubrication, oil mist lubrication, and the like can be cited as lubricating methods that are widely adopted for machine tool spindles. Generally, oil-air lubrication is adopted in the region of high-speed rotation (dmn 1,000,000 or more). As a conventional oil-air lubrication, there is known a system for supplying a high-pressure air and fine oil particles to the interior of the bearing from the side surface of the bearing, using a lubricating oil nozzle piece 101 disposed on the side of the bearing 100 illustrated in FIG. 8A, or a lubricating oil nozzle 101 inserted into the radial through-hole 102a of an outer ring spacer 102 disposed on the side of the bearing 100 illustrated in FIG. 8B.

In this system, a lubricating component such as the nozzle piece 101 is separately required, which increases the number of parts of the spindle. This leads to an increase in the cost of the entire spindle and effort for management. Further, since the nozzle piece 101 is used, the shape of the outer ring spacer and the structure of the housing become complicated, and the labor of designing and machining of the spindle increases. Furthermore, since the nozzle piece 101 is installed on the axial side surface of the bearing, a certain length of the spacer length is required, and the axial length of the spindle is elongated. As a result, the size of the machine tool itself increases, the spindle weight becomes heavier as the length in the axial direction increases, and the whirling speed of the spindle (whirling speed is the rotational speed calculated from the natural frequency of the spindle, and turning the spindle in this whirling speed range results in large vibration) decreases. Also, due to the air curtain generated by high-speed rotation (air curtain is the wall of high-speed air flow in the circumferential direction generated by friction between air and the inner ring outer diameter surface rotating at high-speed), the supply of oil particles from the lubricating nozzle is hindered. As a result, lubricating oil may not be reliably supplied to the interior of the bearing and seizure may occur. In addition, since oil particles are supplied to the balls over the air curtain by the high-pressure air, there is also a problem that wind noise is generated when the high-pressure air collides with the balls. As described above, conventional oil-air lubrication has various problems due to its structure.

As another oil-air lubrication system, as illustrated in FIG. 9, there is known a system using an outer ring lubricating type bearing 110 having an oil groove 112 formed in the circumferential direction on the outer circumferential surface of the outer ring 111, and at the same axial position as the oil groove 112, an oil hole 113 formed to be directed in a radial direction (see, for example, Patent Document 1). In such an outer ring lubricating type bearing, even when the bearing is used at high-speed rotation, the supply of oil particles is not hindered by the air curtain. Therefore, it is possible to use a stable spindle even at high-speed rotation.

FIG. 10 is a schematic view of the spindle in the case of oil-air lubrication using the nozzle piece 101 and oil-air lubrication with the outer ring lubrication specification. The upper half of FIG. 10 is a spindle 120 for oil-air lubrication of the outer ring lubrication specification, and the lower half is the oil-air lubrication spindle 120A using the nozzle piece 101. In FIG. 10, reference numeral 121 denotes a rotary shaft, and reference numeral 122 denotes a rotor of a motor fitted to the rotary shaft 121. In this way, in the case of oil-air lubrication using the nozzle piece 101, in order to supply the lubricating oil from the side surface of the bearing 100, a spacer having a certain axial length or more is required. In contrast, in the case of the outer ring lubrication specification, since it is unnecessary to provide a lubricating spacer, it is possible to simplify the structure of the spacer and the reduction in size of the nozzle piece and to make the axial length of the spacer 123 shorter compared to the case of the specification using the nozzle piece. As a result, with the outer ring lubrication specification, it is easy to design and machine components for spindle and lubrication and manage the components, and overall cost reduction can be achieved in designing, manufacturing and managing of the machine tools. In addition, shortening the axial length of the spacer can lead to downsizing of the machine tool size and improving the spindle whirling speed.

Further, the bearing device using the outer ring lubricating type bearing 110 described in Patent Document 1 is described that the position in the circumferential direction between the lubricating oil introduction hole formed in the housing and the oil hole 113 of the outer ring 111 is made different, so that air passes through the oil groove 112 to lower the air flow velocity at the outlet of the oil hole 113, thereby reducing the noise value at high-speed rotation.

RELATED ART REFERENCE

Patent Document

Patent Document 1: JP-A-2013-79711

SUMMARY OF THE INVENTION

Problems to be Solved by the Invention

Meanwhile, in the oil-air lubrication of the outer ring lubrication specification, vibration and noise are generated when the rolling element passes over the oil hole during rotation of the bearing. This vibration is an air vibration caused by periodic repetition of a phenomenon in which the flow of the air is interrupted for a moment when the rolling element blocks the oil hole, and the flow resumes after passing through the rolling element, which may cause annoying noises depending on the number of revolutions. The vibration tends to increase as the number of rolling elements passing over the oil hole at one time increases, and when the vibration increases, the machining accuracy of the spindle deteriorates. Also, the noise is undesirably increased. Especially, when the number of revolutions is 10000 min$^{-1}$ or more, high frequency noise of several thousand Hz is obtained. Furthermore, when a plurality of oil holes are blocked at the same time by the rolling elements, the supply amount of the lubricating oil becomes extremely small, and when the state in which the supply amount of the lubricating oil abruptly increases after passing through of the rolling elements is repeated, the bearing temperature fluctuates greatly, thereby causing seizure and precision machining to be impossible.

Further, in the bearing device described in Patent Document 1, the noise value is reduced by making the position in the circumferential direction of the lubricating oil introduction hole formed in the housing and the oil hole 113 of the outer ring 111 different from each other. However, it is not a solution to the above problem, and there is concern such as vibration and noise when rolling elements block simultaneously a plurality of oil holes during high-speed rotation.

The present invention has been made in view of the above-described problems, and an object thereof is to provide a rolling bearing capable of suppressing vibration and noise even at high-speed rotation.

Means for Solving the Problems

The aforementioned object of the invention is attained by the following configurations.

(1) A rolling bearing including: an inner ring having an inner ring raceway surface on an outer circumferential surface, an outer ring having an outer ring raceway surface on an inner circumferential surface, and a plurality of rolling elements disposed between the inner ring raceway surface and the outer ring raceway surface in a freely rollable manner, characterized in that:

the outer ring includes a plurality of oil holes penetrating in a radial direction at the same position in an axial direction and spaced apart in a circumferential direction; and circumferential phases of the plurality of oil holes are set to be $\theta \geq 45°$, when the rolling bearing is viewed in the axial direction during rotation of the bearing, when the center of the rolling element passes through the center line of any one of the plurality of oil holes, the rolling element closest to the remaining oil hole is located at a position which intersects with the center line of the oil hole, and when an angle formed by a straight line passing through the center of the rolling element closest to the oil hole and perpendicular to a straight line passing through the center of the rolling bearing and a tangent at a contact point between the center line of the oil hole and the rolling element is set as $\theta$ when the rolling bearing is viewed from the axial direction.

(2) The rolling bearing as set forth in (1), wherein the oil hole has a diameter of 0.5 to 1.0 mm.

(3) The rolling bearing as set forth in (1) or (2), wherein a raceway surface-side opening portion of the oil hole has an opening area larger than that of an outer circumferential surface-side opening portion.

(4) The rolling bearing as set forth in any one of (1) to (3), wherein a concave groove communicating with the oil hole is formed along the circumferential direction on an outer circumferential surface of the outer ring.

(5) The rolling bearing as set forth in (4), wherein an annular groove is formed on the outer circumferential surface of the outer ring on both sides in the axial direction sandwiching the concave groove along the circumferential direction, and an annular seal member is disposed in each of the annular grooves.

(6) The rolling bearing as set forth in any one of (1) to (5), wherein the bearing is a bearing for a machine tool spindle.

Advantages of the Invention

According to the bearing device of the present invention, the outer ring has a plurality of oil holes penetrating in the radial direction at the same position in the axial direction and spaced apart in the circumferential direction, and circumferential phases of the plurality of oil holes are $\theta \geq 45°$, when the rolling bearing is viewed in the axial direction during rotation of the bearing, when the center of the rolling element passes through the center line of any one of the plurality of oil holes, the rolling element closest to the remaining oil hole is located at a position which intersects with the center line of the oil hole, and when an angle formed by a straight line passing through the center of the rolling element closest to the oil hole and perpendicular to a straight line passing through the center of the rolling bearing and a tangent at a contact point between the center line of the oil hole and the rolling element is set as $\theta$ when the rolling bearing is viewed from the axial direction. As a result, while preventing the plurality of oil holes from being blocked by the rolling elements at the same time, the lubricating oil and the air flow, which collided with the rolling element closest to the oil hole and rebound, diffuse in the circumferential direction in the bearing space. Therefore, it is difficult to generate air vibrations without hindering entry of new lubricating air, and vibration and noise can be suppressed even at high-speed rotation. In addition, since the oil diffused in the circumferential direction adheres to the adjacent rolling elements, the lubricity can be improved.

MODES FOR CARRYING OUT THE INVENTION

Hereinafter, a rolling bearing according to an embodiment of the present invention will be described in detail with reference to the drawings.

Figure 1:
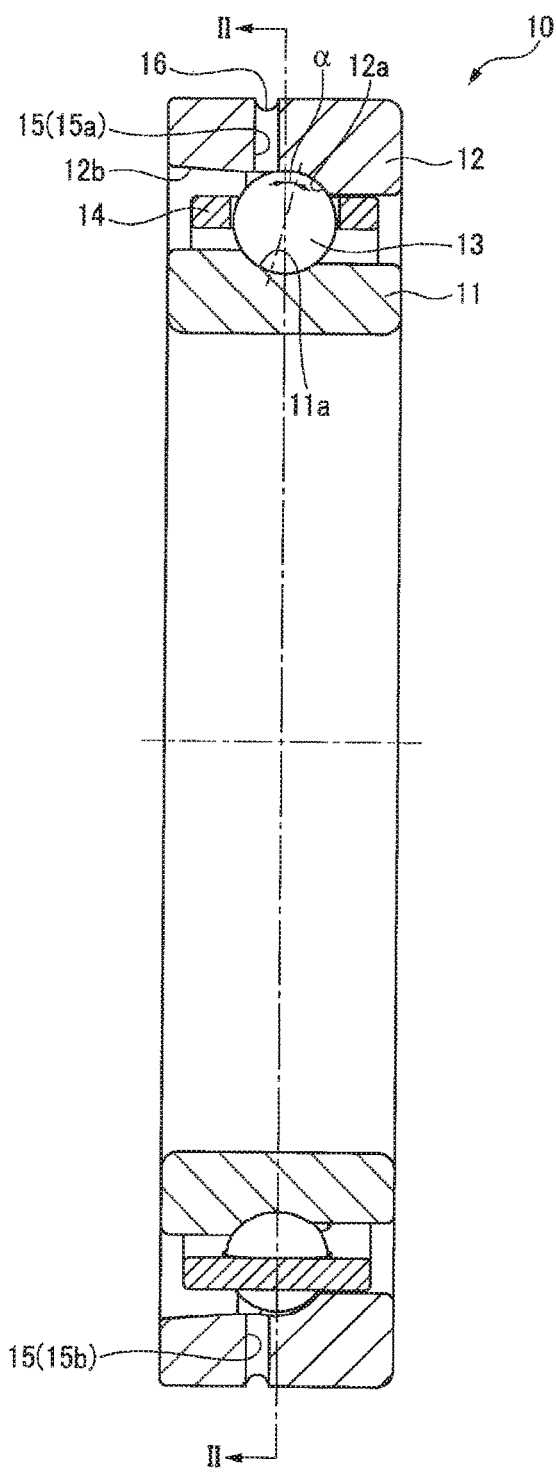
FIG. 1 is a cross-sectional view taken along line I-I of FIG. 2, illustrating a rolling bearing according to an embodiment of the present invention.
Figure 2:
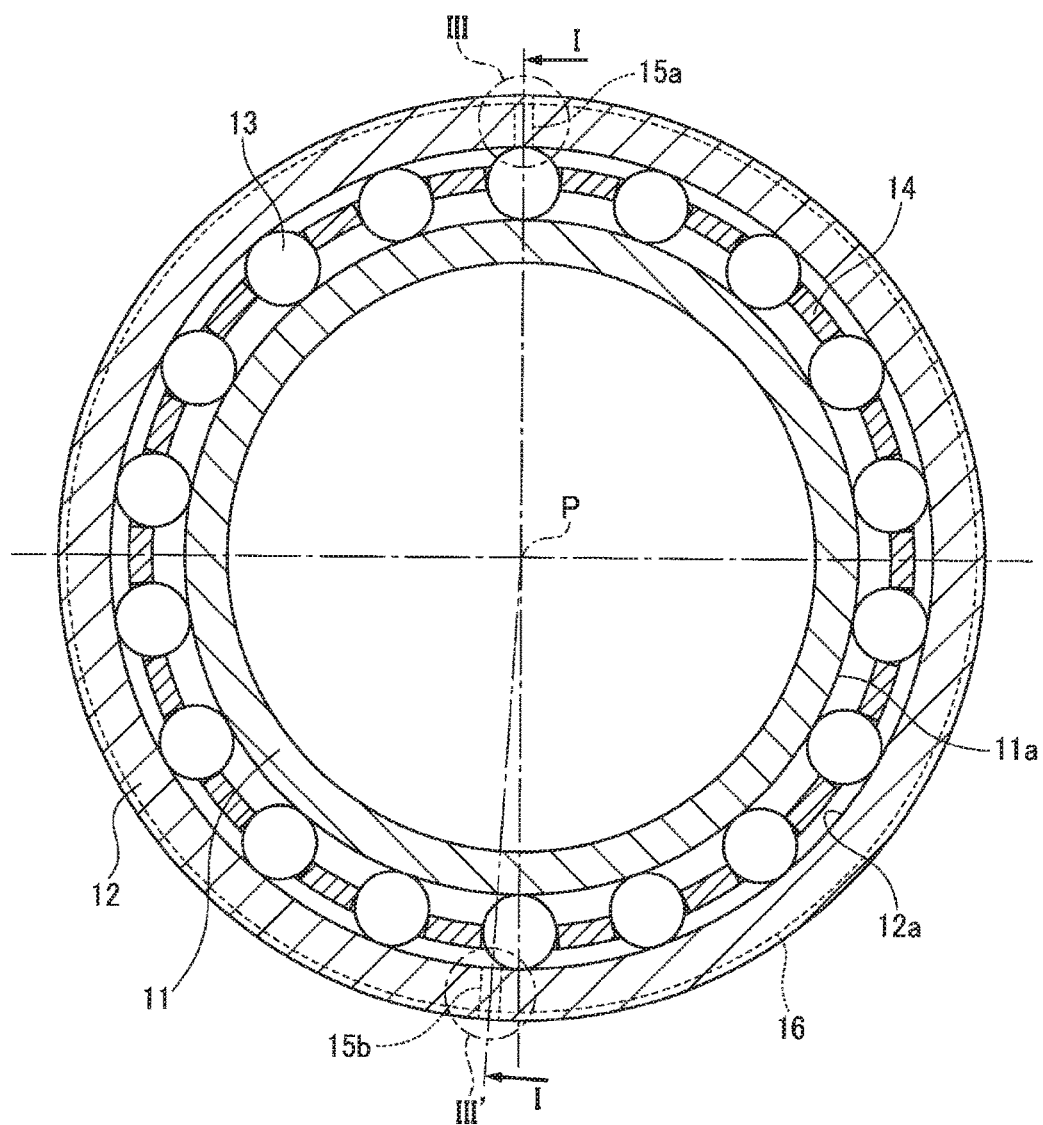
FIG. 2 is a cross-sectional view taken along the line II in FIG. 1.
Figure 10:
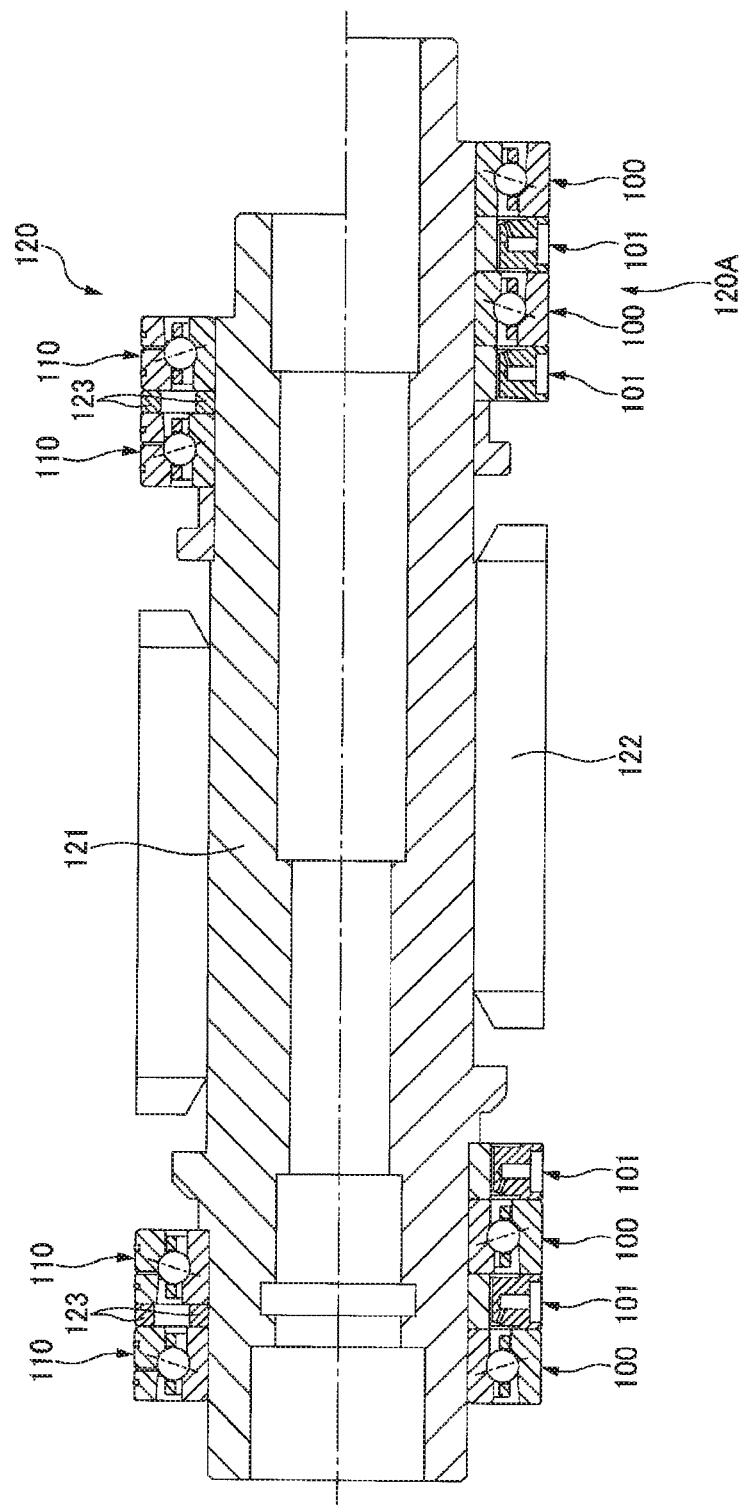
FIG. 10 is a cross-sectional view illustrating a spindle for oil-air lubrication of an outer ring lubrication specification in an upper half thereof and an oil-air lubrication spindle using a nozzle piece in a lower half thereof.

As illustrated in FIGS. 1 and 2, the angular ball bearing 10 of this embodiment, which can be applied to the machine tool spindle device illustrated in the upper half of FIG. 10, has an inner ring 11 having an inner ring raceway surface 11a on its outer circumferential surface, an outer ring 12 having an outer ring raceway surface 12a on the inner circumferential surface thereof, a plurality of balls (rolling elements) 13 held by a retainer 14 and rollingly disposed between the inner ring raceway surface 11a and the outer ring raceway surface 12a with a predetermined contact angle α. A counter bore 12b is provided on the inner circumferential surface on one side in the axial direction of the outer ring 12.

Further, the outer ring 12 has a plurality (two in the present embodiment) oil holes 15 (15a and 15b) which penetrate in the radial direction and are spaced apart in the circumferential direction at the same position in the axial direction. A concave groove 16 communicating with the oil hole 15 is formed along the circumferential direction on the outer circumferential surface of the outer ring 12. As a result, in the angular ball bearing 10, the oil particles and the lubricating air supplied from the oil supply passage of the housing (not illustrated) are directly supplied to the ball 13 via the concave groove 16 and the oil hole 15 of the outer ring 12, and the oil-air lubrication is performed.

In the present embodiment, the diameter of the oil hole 15 is set to 0.5 to 1.0 mm.

The raceway surface side opening portion of the oil hole 15 may be formed such that at least a part of, preferably the entire opening portion overlaps the ball 13 in the axial direction, and more preferably, at least a part thereof may be formed in an outer ring raceway surface 12a.

Furthermore, while it is necessary to provide a plurality of oil holes 15 for improving the reliability at the time of high-speed rotation (to uniformly spread the lubricating oil over the entire raceway surface without unevenness), when the balls 13 simultaneously pass through the oil holes 15a and 15b during the rotation of the bearing, (that is, the circumferential direction phases of the center lines L1 and L2 of the oil holes 15 described later and the center A of the ball 13 coincide with each other), as described above, vibration and noise increase. Thus, the plurality of oil holes 15a and 15b is designed so that the balls 13 do not pass therethrough at the same time.

Figure 3A:
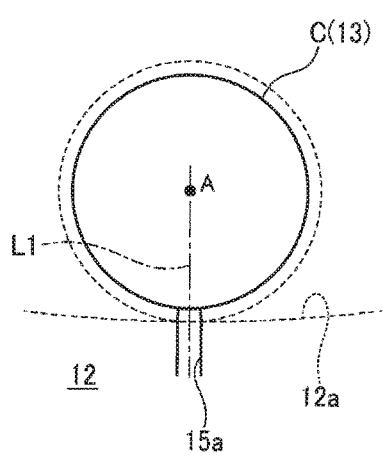
FIG. 3A is an enlarged view illustrating a phase relationship between the rolling element and the outer ring in the portion III of FIG. 2.
Figure 3B:
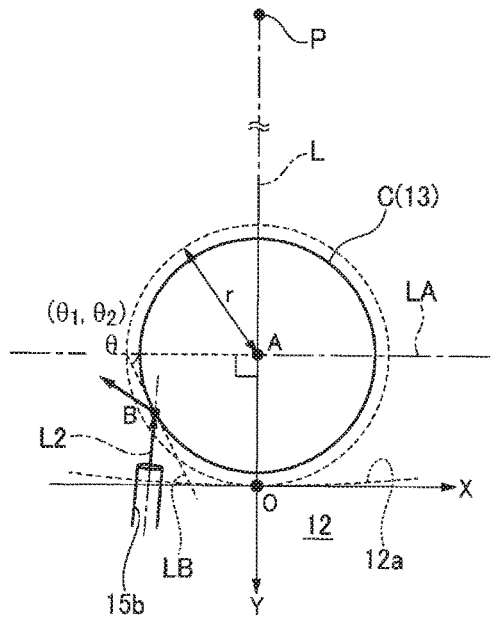
FIG. 3B is an enlarged view illustrating a phase relationship between the rolling element and the outer ring in the portion III of FIG. 2.

Therefore, in the present embodiment, the phases in the circumferential direction of the plurality of oil holes 15a and 15b are designed as illustrated in FIGS. 2 to 3B. FIGS. 3A and 3B illustrate axially projected views of the ball 13 having the radius r, the outer ring raceway surface 12a, and the oil holes 15a and 15b. In FIGS. 3A and 3B, the contact point between the ball 13 and the outer ring raceway surface 12a is illustrated as a point O (the origin of the X coordinate and the Y coordinate), the center of the ball 13 is illustrated as a point A, and an intersection (that is, the contact point between the center line L2 of the oil hole 15b and the ball 13) between the center line L2 of the oil hole 15b and a circle C representing the surface of the ball 13 is illustrated as as a point B. Actually, although the points O, A and B do not exist on the same radial cross section, in FIGS. 3A and 3B, since the outer ring raceway surface 12a, the ball 13, and the oil hole 15b are projected on a plane parallel to the radial cross section, the three points (O, A, and B) are present on the same plane. An angle formed by a straight line LA passing through the point A and perpendicular to the straight line L passing through the center P of the angular ball bearing 10 and the tangent LB of the ball 13 at the point B is θ.

Here, during the rotation of the bearing, when the center A of one of the balls 13 passes through the center line L1 of any one of the oil holes 15a, the ball 13 closest to the other oil hole 15b is located at a position intersecting with the center line L2 of the oil hole 15b, and when the angular ball bearing 10 is viewed from the axial direction, an angle formed by the straight line LA passing through the center A of the ball 13 closest to the oil hole 15b and perpendicular to the straight line L passing through the center P of the angular ball bearing 10 and a tangent LB at a contact point B between the center line L2 of the oil hole 15b and the ball 13 is set as θ, the design is provided so that θ≥45°.

Figure 4A:
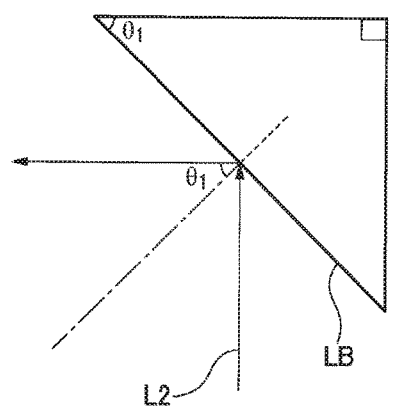
FIG. 4A is a schematic view illustrating the relationship between the traveling direction of oil and lubricating air and a surface of the rolling element in a state where $\theta$ illustrated in FIG. 3B is 45°.
Figure 4B:
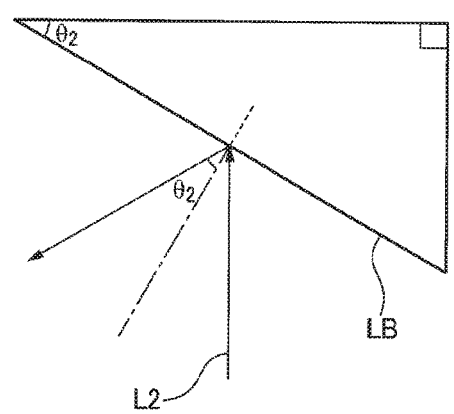
FIG. 4B is a schematic view illustrating the relationship between the traveling direction of the oil and the lubricating air and the surface of the rolling element in a state where $\theta$ illustrated in FIG. 3B is 30°.

That is, the air that has entered the bearing from the oil hole 15 during lubrication changes its traveling direction after colliding with the ball 13. After collision with the ball 13, depending on the direction of the air, there is a possibility that lubrication is hindered by the air after collision. FIGS. 4A and 4B illustrate schematic diagrams of the relationship between the lubricating air and the rolling element surface. In FIGS. 4A and 4B, the hypotenuse of a right triangle represents the tangent LB passing through the point B in FIG. 3B, and $θ_1$ and $θ_2$ in FIGS. 4A and 4B correspond to θ in FIG. 3B. Also, in FIGS. 4A and 4B, the arrows represent the flow of air.

As illustrated in FIG. 4A, when $θ_1$=45°, the traveling direction of the lubricating air having entered the interior of the bearing through the oil hole 15 is changed by 90° with respect to the approaching direction when colliding with the ball 13. On the other hand, when θ is less than 45°, for example, as illustrated in FIG. 4B, when $θ_2$=30°, the traveling direction of the lubricating air is changed by 120° with respect to the approach direction when colliding with the ball 13. Thus, as θ decreases, the traveling direction change after the lubricating air collides with the ball 13 increases. As a result, a phenomenon occurs in which the air after the collision hinders entry of new lubricating air into the bearing, and it is in the same state as the oil hole 15 is blocked by the balls 13.

Therefore, in order to prevent entry of lubricating air from being hindered by the air after collision, it is desirable that θ in FIG. 3B is 45° or more. Therefore, in order to prevent occurrence of the vibration, the noise, and the large variation in the bearing temperature, when the phase in the circumferential direction between one of the balls 13 and one oil hole 15a of the oil holes 15 provided in the outer ring 12 coincides with each other (state of FIG. 3A), the positional relationship between the other oil hole 15b and the balls 13 is required to satisfy θ≥45° illustrated in FIG. 3B. Furthermore, when θ exceeds 45°, since the oil or air flow that collided with the ball 13 and bounced diffuses in the circumferential direction space without colliding with the outer ring raceway surface 12a, the air vibration hardly occurs. Since oil adheres to the adjacent balls 13, it is also preferable from the viewpoint of lubricity.

Also, as the angle θ increases, since the collision angle of the oil particles to the ball decreases (approaches parallel to the tangent), the oil particles do not bounce off, and the oil particles adhere to the ball surface due to the viscosity (wettability) of the oil, it is desirable from the viewpoint of improvement in lubricity. In addition, since the rebound of the air flow caused by the air is also reduced and the air flows smoothly along the surface of the ball, air vibration hardly occurs and noise can be reduced. At the moment when one oil hole reaches the state of FIG. 3A, since the blocked air flows to the other radial lubricating hole, the above effect is further expanded.

Further, when θ exceeds 90°, at the moment when one oil hole 15a reaches the state of FIG. 3A, the circumferential phase of the other oil hole 15b is not the ball 13 but the pillar of the retainer 14, the oil particles cannot be supplied directly to the balls 13. In this state, the retainer 14 is pushed by the air, and the retainer 14 moves in the radial direction. Since such a phenomenon occurs at the moment when any one of the plurality of oil holes 15 and one of the balls 13 are in the state of FIG. 3A, during the use of the bearing, the radial movement of the retainer 14 repeatedly occurs in various directions, and the retainer 14 abnormally vibrates, and troubles such as retainer sounds are likely to occur. Therefore, it is preferable that θ≤90°.

As described above, according to the angular ball bearing 10 of the present embodiment, the outer ring 12 is provided with a plurality of oil holes 15 penetrating in the radial direction at the same position in the axial direction and spaced apart in the circumferential direction. The circumferential phase of the plurality of oil holes 15 is set as θ≥45° such that, when the angular ball bearing 10 is viewed from the axial direction during rotation of the bearing, when the center A of the ball 13 passes through the center line L1 of one oil hole 15a, the ball 13 closest to the remaining oil hole 15b is located at a position intersecting with the center line L2 of the oil hole 15b, and when the angular ball bearing 10 is viewed from the axial direction, when the angle formed by the straight line LA passing through the center A of the ball 13 closest to the oil hole 15b and perpendicular to the radial direction of the angular ball bearing 10, and the tangent line LB of the circle C representing the rolling element surface at the contact point B between the center line L2 of the oil hole 15b and the ball 13 is set as θ. This prevents the plurality of oil holes 15 from being blocked by the balls 13 at the same time, and the oil or air flow collided with the ball 13 closest to the oil hole 15 and rebound diffuses in the circumferential direction in the bearing space. Therefore, air vibrations hardly occur, and vibration and noise can be suppressed even at high-speed rotation without disturbing entry of new lubricating air. In addition, since the oil diffused in the circumferential direction adheres to the adjacent balls 13, lubricity can be improved.

In addition, since the diameter of the oil hole 15 is set to 0.5 to 1.0 mm, it is possible to easily ensure the supply air pressure through which the lubricating oil can be supplied directly to the ball 13 through the oil hole 15.

Further, the present invention is not limited to the above-described embodiment, but may be appropriately modified, improved, and the like.

First Modified Example

Figure 5C:
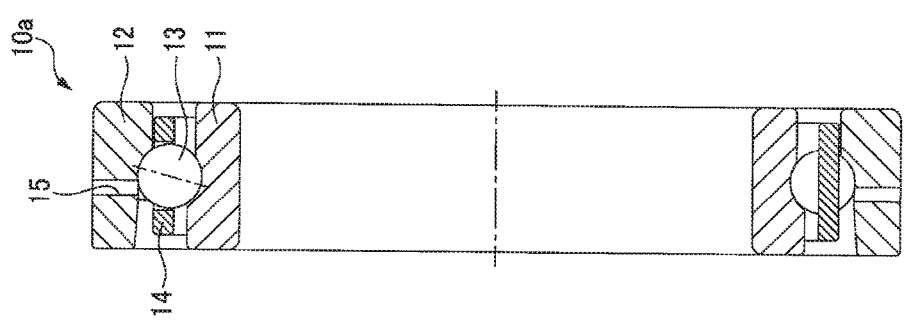
FIGS. 5A to 5C are cross-sectional views of rolling bearings of first to third modified examples, respectively.
Figure 5B:
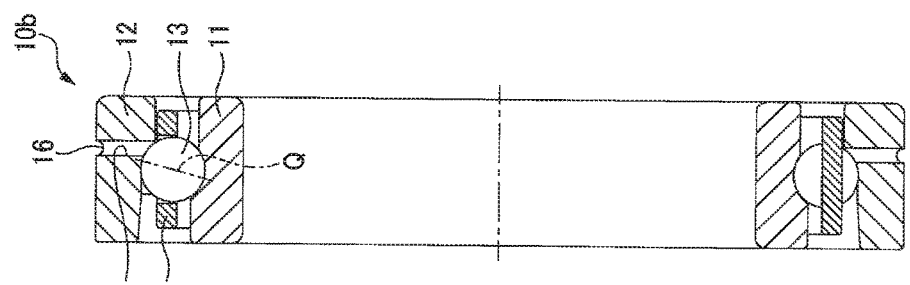
Figure 5A:
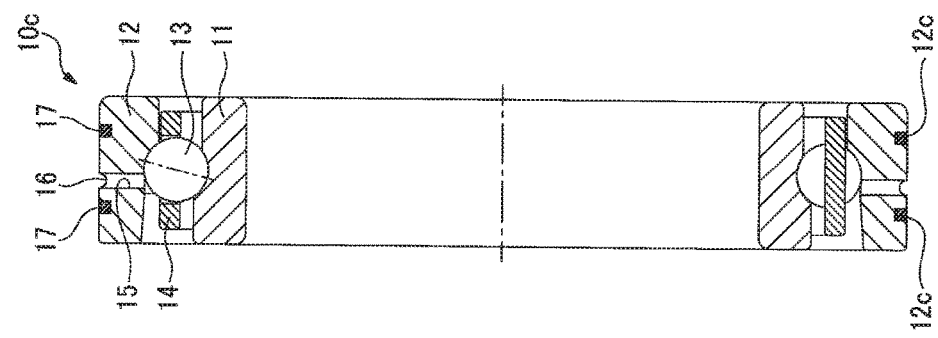

For example, as in the angular ball bearing 10a of the first modified example illustrated in FIG. 5A, the outer ring 12 may have a configuration having no concave groove.

Second Modified Example

As in the angular ball bearing 10b of the second modified example illustrated in FIG. 5B, the oil hole 15 and the concave groove 16 of the outer ring 12 may be formed on the outer ring raceway surface 12a of the counter bore side with respect to the extension line Q of the contact angle.

Third Modified Example

As in the angular ball bearing 10c of the third modified example illustrated in FIG. 5C, an annular groove 12c is formed on the outer circumferential surface of the outer ring 12 along the circumferential direction on both axial sides sandwiching the concave groove 16, and annular seal members 17 may be disposed in each of the annular grooves 12c in order to prevent leakage of oil during use.

Fourth to Seventh Modified Examples

Further, like the angular ball bearings 10d to 10g of the fourth to seventh modified examples illustrated in FIGS. 6A to 6D, the raceway surface-side opening portion of the oil hole 15 may have an opening area greater than the outer circumferential surface-side opening portion. That is, in the rolling bearing of the outer ring lubrication type, since the lubricating oil is directly supplied to the ball 13 through the oil hole 15, even if the supply air pressure is lowered near the raceway surface-side opening portion, the lubricating oil can be supplied to the ball 13. Therefore, the air pressure at the raceway surface-side opening portion can be lowered to suppress the collision of the high-pressure air against the ball 13, and the noise during the rotation of the bearing can be reduced.

Figure 6A:
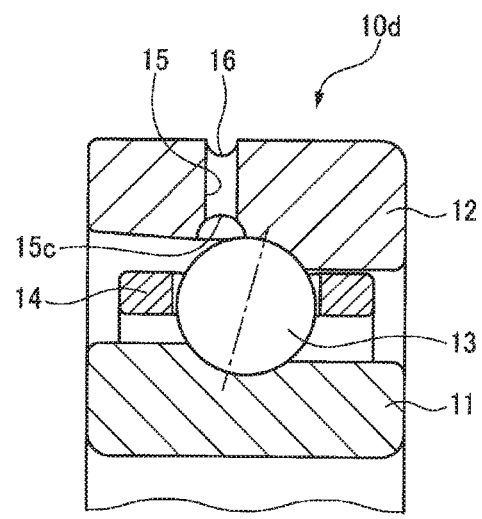
FIGS. 6A to 6D are cross-sectional views of rolling bearings of fourth to seventh modified examples in which the shapes of the oil holes are changed, respectively.
Figure 6B:
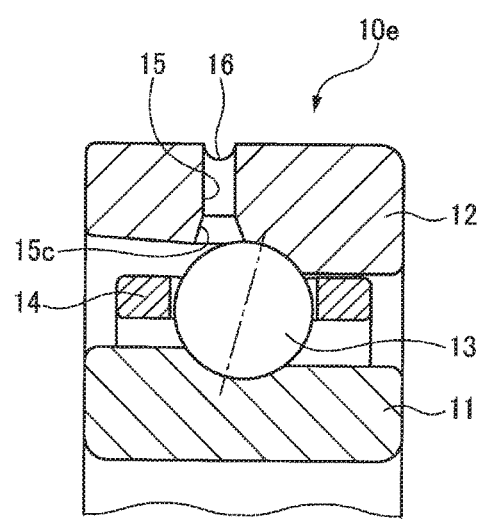
Figure 6C:
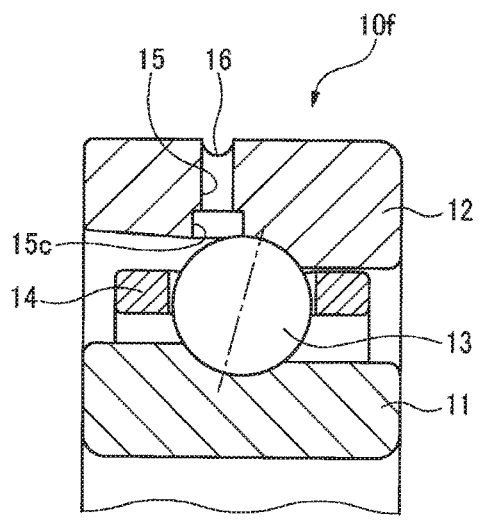
Figure 6D:
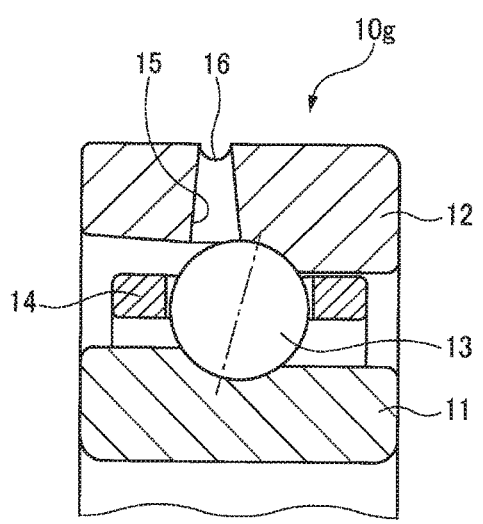

That is, in the raceway surface-side opening portion of the oil hole 15, by forming the portion 15c on the raceway surface side into a hemispherical shape as illustrated in FIG. 6A, a conical shape as illustrated in FIG. 6B, and a cylindrical shape having a large diameter as illustrated in FIG. 6C, the opening area may be increased. Alternatively, as illustrated in FIG. 6D, the raceway surface-side opening portion of the oil hole 15 expands in a conical shape toward the inner diameter side over the entire radial direction, and thus, the opening area may be increased.

Eighth Modified Example

Figure 7:
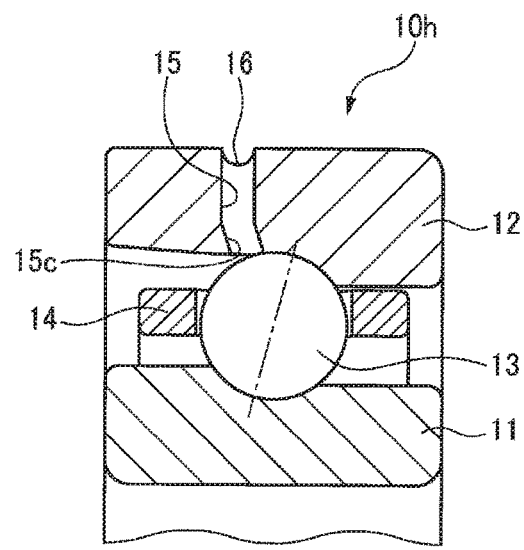
FIG. 7 is a cross-sectional view of a rolling bearing of an eighth modified example in which the shape of the oil hole is changed.
Figure 8A:
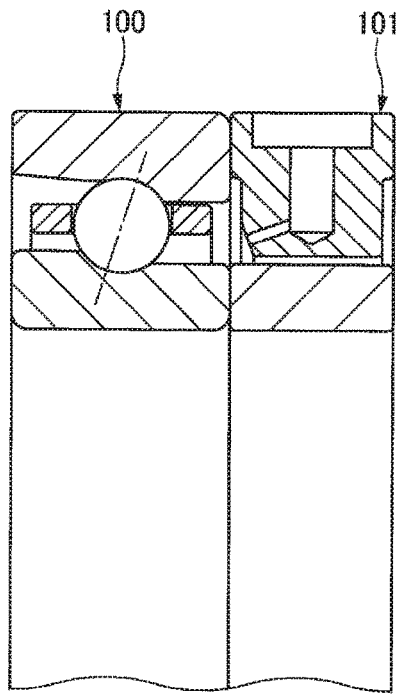
FIGS. 8A and 8B are cross-sectional views illustrating conventional oil-air lubrication using a nozzle piece.
Figure 8B:
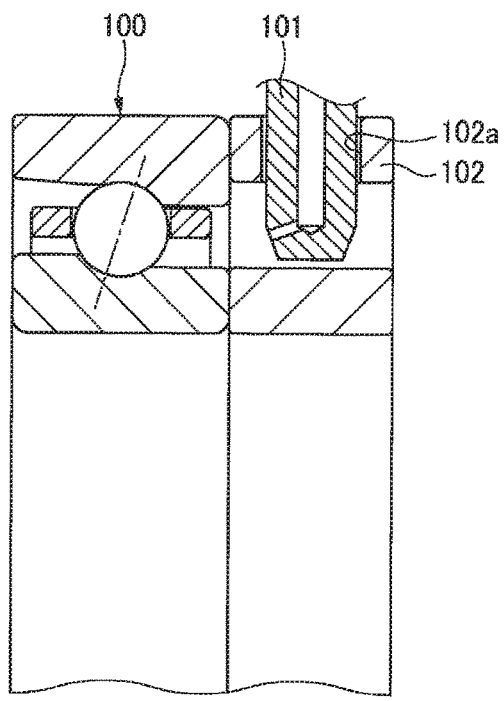
Figure 9:
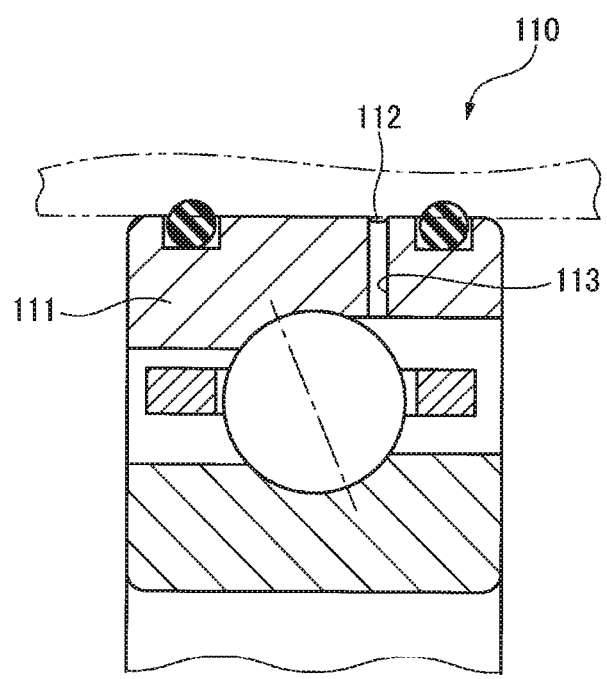
FIG. 9 is a cross-sectional view of an oil-air lubricated rolling bearing of an outer ring lubrication specification.

Further, as in the angular ball bearing 10h of the eighth modified example illustrated in FIG. 7, the oil hole 15 may be bent toward the ball 13 in the portion 15c on the raceway surface side. As a result, the lubricating oil can be supplied to the portion of the ball 13 close to the center of the spherical surface.

Although the case where the outer ring 12 has the two oil holes 15a and 15b has been described in this embodiment, the outer ring 12 may have three or more oil holes 15. In that case, a configuration may be provided in which, when the circumferential phases of one of the balls 13 and one of the oil holes 15 coincide with each other, each of the balls 13 closest to the remaining oil holes 15 satisfies the above-described angle θ≥45°.

Further, in the present embodiment, the angular ball bearing 10 has been described as an example of the rolling bearing, but the rolling bearing can also be applied to any other type of rolling bearing, such as a deep groove ball bearing, a cylindrical roller bearing having a cylindrical roller as a rolling element, and a tapered roller bearing having a tapered roller as a rolling element.

Furthermore, the rolling bearing of the present invention is not limited to those applied to the spindle device for machine tools, and can also applied as a rolling bearing of a high-speed rotating device such as a rolling bearing for a general industrial machine or a rolling bearing for a motor.

This application is based on Japanese Patent Application No. 2015-020738 filed on Feb. 4, 2015, the contents of which are incorporated herein by reference.

DESCRIPTION OF REFERENCE NUMERALS AND SIGNS

10: Angular ball bearing (rolling bearing)
11: Inner ring
11a: Inner ring raceway surface
12: Outer ring
12a: Outer ring raceway surface
12b: Counter bore
13: Ball (rolling elements)
14: Retainer
15, 15a, 15b: Oil hole
16: Concave groove
LA: Straight line that passes through the center of the rolling element closest to the oil hole and is perpendicular to the straight line passing through the center of the rolling bearing, when the rolling bearing is viewed from the axial direction
LB: Tangent at a contact point between the center line of the oil hole and the rolling element, when the rolling bearing is viewed from the axial direction
θ: angle formed by LA and LB

The invention claimed is:

1. A rolling bearing comprising: an inner ring having an inner ring raceway surface on an outer circumferential surface, an outer ring having an outer ring raceway surface on an inner circumferential surface, and a plurality of rolling elements disposed between the inner ring raceway surface and the outer ring raceway surface in a freely rollable manner, characterized in that:

the outer ring includes a plurality of oil holes penetrating in a radial direction at the same position in an axial direction and spaced apart in a circumferential direction; and circumferential phases of the plurality of oil holes are set to be θ≥45°, when the rolling bearing is viewed in the axial direction during rotation of the bearing, when the center of the rolling element passes through the center line of any one of the plurality of oil holes, the rolling element closest to at least one remaining oil hole is located at a position which intersects with the center line of the oil hole, and when an angle formed by a straight line passing through the center of the rolling element closest to the at least one remaining oil hole and perpendicular to a straight line passing through the center of the rolling bearing and a tangent at a contact point between the center line of the oil hole and the rolling element is set as θ when the rolling bearing is viewed from the axial direction.

2. The rolling bearing according to claim 1, wherein the oil hole has a diameter of 0.5 to 1.0 mm.

3. The rolling bearing according to claim 2, wherein a concave groove communicating with the oil hole is formed along the circumferential direction on an outer circumferential surface of the outer ring.

4. The rolling bearing according to claim 2, wherein the bearing is a bearing for a machine tool spindle.

5. The rolling bearing according to claim 3, wherein the bearing is a bearing for a machine tool spindle.

6. The rolling bearing according to claim 1, wherein a raceway surface-side opening portion of the oil hole has an opening area larger than that of an outer circumferential surface-side opening portion.

7. The rolling bearing according to claim 6, wherein the bearing is a bearing for a machine tool spindle.

8. The rolling bearing according to claim 1, wherein a concave groove communicating with the oil hole is formed along the circumferential direction on an outer circumferential surface of the outer ring.

9. The rolling bearing according to claim 8, wherein an annular groove is formed on the outer circumferential surface of the outer ring on both sides in the axial direction sandwiching the concave groove along the circumferential direction, and an annular seal member is disposed in each of the annular grooves.

10. The rolling bearing according to claim 9, wherein the bearing is a bearing for a machine tool spindle.

11. The rolling bearing according to claim 8, wherein the bearing is a bearing for a machine tool spindle.

12. The rolling bearing according to claim 1, wherein the bearing is a bearing for a machine tool spindle.

* * * * *